United States Patent
Chaigneau et al.

(10) Patent No.: US 12,504,127 B2
(45) Date of Patent: Dec. 23, 2025

(54) SUPPORT DEVICE FOR AT LEAST ONE INSTRUMENT ON A TOWER FOR LOADING AND/OR OFFLOADING A TANK OF A SHIP INTENDED TO CONTAIN A LIQUEFIED GAS

(71) Applicant: GAZTRANSPORT ET TECHNIGAZ, Saint-Rémy-lès-Chevreuse (FR)

(72) Inventors: Franck Chaigneau, Saint-Rémy-lès-Chevreuse (FR); Florian Bardin, Saint-Rémy-lès-Chevreuse (FR)

(73) Assignee: GAZTRANSPORT ET TECHNIGAZ, Saint-Remy-les-Chevreuse (FR)

( * ) Notice: Subject to any disclaimer, the term of this patent is extended or adjusted under 35 U.S.C. 154(b) by 19 days.

(21) Appl. No.: 18/480,058

(22) Filed: Oct. 3, 2023

(65) Prior Publication Data
US 2024/0110672 A1  Apr. 4, 2024

(51) Int. Cl.
*F17C 13/00* (2006.01)
*B63B 27/34* (2006.01)

(52) U.S. Cl.
CPC ............ *F17C 13/004* (2013.01); *B63B 27/34* (2013.01); *F17C 2201/0157* (2013.01);
(Continued)

(58) Field of Classification Search
CPC ............ F17C 13/004; F17C 2201/0157; F17C 2201/052; F17C 2221/033;
(Continued)

(56) References Cited

U.S. PATENT DOCUMENTS

| | | | |
|---|---|---|---|
| 8,375,875 B2 * | 2/2013 | Kim | B63B 27/24 62/53.2 |
| 2020/0240588 A1 * | 7/2020 | Al Khowaiter | C01B 3/34 |
| 2024/0076013 A1 * | 3/2024 | Lea | F17C 1/002 |

FOREIGN PATENT DOCUMENTS

| | | | | |
|---|---|---|---|---|
| CN | 109305289 B | * | 9/2019 | ............. B63B 35/00 |
| FR | 2806106 A1 | | 9/2001 | |

(Continued)

OTHER PUBLICATIONS

Towerreinforcement.com bolt-on guy lugs product page, web.archive.org date: Mar. 6, 2019, https://www.towerreinforcement.com/images/GUY%20TOWER%20REIN._Page_02.jpg (Year: 2019).*
(Continued)

*Primary Examiner* — Terrell L McKinnon
*Assistant Examiner* — Ding Y Tan
(74) *Attorney, Agent, or Firm* — Osha Bergman Watanabe & Burton LLP

(57) ABSTRACT

A support device for an instrument on a loading/offloading tower of a tank of a ship is disclosed. The tower has multiple vertical masts linked to one another, pairwise, by struts extending on a strut axis, and a distal portion extending on a first axis, the distal portion being terminated by a first surface capable of forming a first surface contact with a strut extending on its strut axis substantially at right angles to the first axis. The installed first surface has a degree of freedom in rotation about the strut axis, a proximal portion extending on a second axis substantially at right angles to the first axis, linked to the distal portion. An installed fixing surface immobilized by fixing to the instrument has a degree of freedom in rotation about the second axis and a degree of freedom in translation on a third axis parallel to the second axis.

12 Claims, 6 Drawing Sheets

(52) U.S. Cl.
CPC .. *F17C 2201/052* (2013.01); *F17C 2221/033* (2013.01); *F17C 2223/0153* (2013.01); *F17C 2223/0161* (2013.01); *F17C 2223/033* (2013.01); *F17C 2227/0135* (2013.01); *F17C 2250/0491* (2013.01); *F17C 2265/06* (2013.01); *F17C 2270/0105* (2013.01); *F17C 2270/0107* (2013.01); *F17C 2270/0121* (2013.01)

(58) Field of Classification Search
CPC ...... F17C 2223/0153; F17C 2223/0161; F17C 2223/033; F17C 2227/0135; F17C 2250/0491; F17C 2265/06; F17C 2270/0105; F17C 2270/0107; F17C 2270/0121; B63B 27/34
See application file for complete search history.

(56) References Cited

FOREIGN PATENT DOCUMENTS

| | | | | | |
|---|---|---|---|---|---|
| FR | 3025491 | A1 | | 3/2016 | |
| KR | 2012-0013255 | A | | 2/2012 | |
| KR | 20120077627 | A | * | 7/2012 | |
| KR | 20140041065 | A | * | 4/2014 | |
| KR | 101422505 | B1 | * | 7/2014 | ............ B63B 27/24 |
| KR | 101465951 | B1 | * | 11/2014 | ............ B63B 27/30 |
| KR | 20150015731 | A | * | 2/2015 | |
| KR | 20150116257 | A | * | 10/2015 | ............ B63B 27/24 |
| KR | 20170033148 | A | * | 3/2017 | |
| KR | 20170036178 | A | * | 4/2017 | ............ B63B 27/24 |
| KR | 20180000860 | U | * | 3/2018 | ............ B63B 25/16 |
| KR | 20180076914 | A | * | 7/2018 | ............... F16L 3/01 |
| KR | 200493618 | Y1 | * | 8/2018 | |

OTHER PUBLICATIONS

French Search Report in corresponding French Application No. FR 2210066, dated May 9, 2023 (10 pages).

* cited by examiner

SUPPORT DEVICE FOR AT LEAST ONE INSTRUMENT ON A TOWER FOR LOADING AND/OR OFFLOADING A TANK OF A SHIP INTENDED TO CONTAIN A LIQUEFIED GAS

The invention relates to the field of the storage and/or transportation of a cargo of liquefied gas, such as liquefied natural gas, ethane, ammonia, hydrogen or even liquefied petroleum gas.

It relates more particularly to a loading and/or offloading assembly comprising a loading and/or offloading tower for a sealed and thermally insulated tank of a ship intended to contain this liquefied gas.

Liquefied natural gas, commonly known by the acronym "LNG" is an important source of energy, composed of approximately 95% methane. More particularly, LNG is stored in the liquid state in a thermally insulated tank at a temperature close to −160° C., the LNG then occupying 1/600 of the volume that it would occupy in the gaseous state, thus making it possible to facilitate the transportation from a first site to a second site.

LNG can thus be transported from one site to the other by sea using ships called methane tankers, and it is then stored in sealed and thermally insulated tanks of the methane tanker.

LNG can also be used as fuel for a ship, such as a goods transportation ship, such as a container ship. For ecological and economic reasons, the use of LNG as fuel offers an advantage over the conventional fuels, notably derived from oil.

Conventionally, the LNG storage tank comprises a loading and/or offloading tower suspended from a cover that makes it possible to close the tank. The loading and/or offloading tower of the tank can comprise, by way of example, a structure of tripod type, that is to say comprising three vertical masts linked to one another by crossmembers, or struts, forming a lattice structure.

In order to monitor the state of the cargo of the liquefied gas in the tank, measurement instruments (for example temperature sensors, liquid level measurement instruments) must be guided along the loading and/or offloading tower.

FIG. 1 represents a portion of loading and/or offloading tower 5, known from the prior art, along which there extends at least one protection tube 40 for an instrument or instruments, guided and held along the loading and/or offloading tower 5 by different support devices 41. Measurement instruments present in the tank that can be cited include temperature sensors for monitoring the temperature of the liquefied gas, and/or instruments for measuring the liquefied gas liquid level in the tank to determine the level of filling of the tank. These measurement instruments are disposed, with the associated wiring, in the protection tubes 40. These tubes extend vertically along the tower 5. To ensure the guiding and holding of a protection tube 40 along the tower 5, a support device 41 is, on the one hand, fixed to the protection tube 40 and, on the other hand, bears on a strut 531 (oblique and horizontal). More specifically, a protection tube 40 generally comprises a holding piece 43 exhibiting mobility in translation along the protection tube 40. The holding piece 43 typically comprises an antiadhesive coating, for example PTFE (abbreviation of polytetrafluoroethylene) to guarantee the sliding of the piece 43 along the tube 40 and allow the positioning of the holding piece 43 according to the height of the tank. A plate 42 is linked to the holding piece 43. The plate 42 extends in a direction that is preferentially radial with respect to the protection tube 40. The plate 42 takes the form of a planar surface which serves as surface contact for the support device 41. Thus, the support device 41 can be fixed to the plate 42. The support device 41 constitutes a rigidity between the strut 531 and the plate 42 linked to the protection tube 40, thus guaranteeing the guiding of the protection tube 40 containing measurement instruments.

However, and as can be seen in FIG. 1, the result thereof is that the support device has a form (dimensions and angle) that is conditioned by the distance between the plate 42 linked to the protection tube 40 and the strut 531. Consequently, one and the same loading and/or offloading tower is currently provided with support devices of different dimensions and forms.

The coexistence of these different support devices generates complexity at the manufacturing level. The development plan requires increased vigilance because of the many details of form and dimensions to be taken into account. Finally, during assembly, the operator must be sure to have the right support devices.

Hereinbelow, for the purposes of simplification, the term instrument is used to designate an assembly composed of a protection tube 40 (containing the measurement instrument or instruments) and its plate 42. Thus, a support device of at least one instrument on the tower 5 is a support device of at least one tube 40 via the plate 42.

The invention aims to wholly or partly mitigate the abovementioned problems by proposing a single support device for an instrument suitable for guiding and supporting the instrument along the loading and/or offloading tower, regardless of its positioning with respect to the struts of the tower.

To this end, the subject of the invention is a support device for at least one instrument on a loading and/or offloading tower of a tank of a ship intended to contain a liquefied gas, the loading and/or offloading tower comprising a plurality of vertical masts intended to extend in the tank and linked to one another, pairwise, by struts, each strut extending on an axis called strut axis, the support device being characterized in that it comprises:
- a distal portion extending on a first axis, the distal portion being terminated by a first surface capable of forming a first surface contact with a strut extending on its strut axis substantially at right angles to the first axis, the first surface having, in a configuration of installation, a degree of freedom in rotation about said strut axis;
- a proximal portion extending on a second axis substantially at right angles to the first axis, linked to the distal portion;
- a fixing surface having, in the configuration of installation, a degree of freedom in rotation about the second axis and a degree of freedom in translation on a third axis parallel to the second axis, the fixing surface being intended to be immobilized by fixing to the instrument in a final configuration.

By virtue of these features, a single support device according to the invention can be positioned at any level of the tower and regardless of the distance and the geometry between the strut and the plate of the protection tube of the instrument. The degrees of freedom of the support device can be combined for the device to be able to come into contact against the strut and the plate.

In one embodiment of the support device according to the invention, the degree of freedom of the fixing surface in rotation about the second axis and the degree of freedom of the fixing surface in translation on the third axis are independent of one another.

In one embodiment, the support device according to the invention comprises a bent piece comprising the distal portion and the proximal portion, and a platform comprising the fixing surface and a positioning surface having a form complementing the proximal portion and intended to cooperate with the proximal portion.

In one embodiment of the support device according to the invention, the proximal part has a circular section defined by an outer radius, and the complementary form of the positioning surface is a circular arc of a radius substantially equal to the outer radius.

Advantageously, the distal and proximal portions are at least partially hollow.

Advantageously, the support device according to the invention is made of a metallic material, preferentially of stainless steel.

The invention relates also to a loading and/or offloading assembly for a tank of a ship intended to contain a liquefied gas comprising a loading and/or offloading tower comprising a plurality of vertical masts intended to extend in the tank and linked to one another, pairwise, by struts, each strut extending on an axis called strut axis, at least one instrument and at least one support device as described previously supporting the at least one instrument on the loading and/or offloading tower.

The invention relates also to a tank of a ship intended to contain a liquefied gas comprising such a loading and/or offloading assembly.

The invention also covers a ship comprising a double-hull and such a tank disposed in the double-hull.

The invention relates to a method for loading or offloading a ship as mentioned previously, wherein a fluid is conveyed through insulated pipelines from or to a floating or onshore storage installation to or from the tank of the ship.

The invention relates to a transfer system for a fluid, the system comprising such a ship, insulated pipelines arranged so as to link the tank installed in the double-hull of the ship to a floating or onshore storage installation and a pump for driving a fluid through the insulated pipelines from or to the floating or onshore storage installation to or from the tank of the ship.

The invention relates also to a computer program comprising computer-executable instructions which, when they are executed by a processor, cause the processor to control an additive manufacturing device for manufacturing the support device according to the invention.

Finally, the invention relates to a method for manufacturing such a support device by additive manufacturing, the method comprising:

obtaining an electronic file representing a geometry of said support device; and controlling an additive manufacturing device to manufacture, in one or more additive manufacturing steps, the support device according to the geometry specified in the electronic file.

The invention will be better understood, and other aims, details, features and advantages thereof will emerge more clearly from the following description of several particular embodiments of the invention, given in a purely illustrative and nonlimiting manner, with reference to the attached drawings.

The feature, variants and the various embodiments of the invention can be associated with one another, according to various combinations, in as much as they are not incompatible or mutually exclusive. It will notably be possible to devise variants of the invention comprising only a selection of features described hereinbelow isolated from the other features described.

Figure 1:
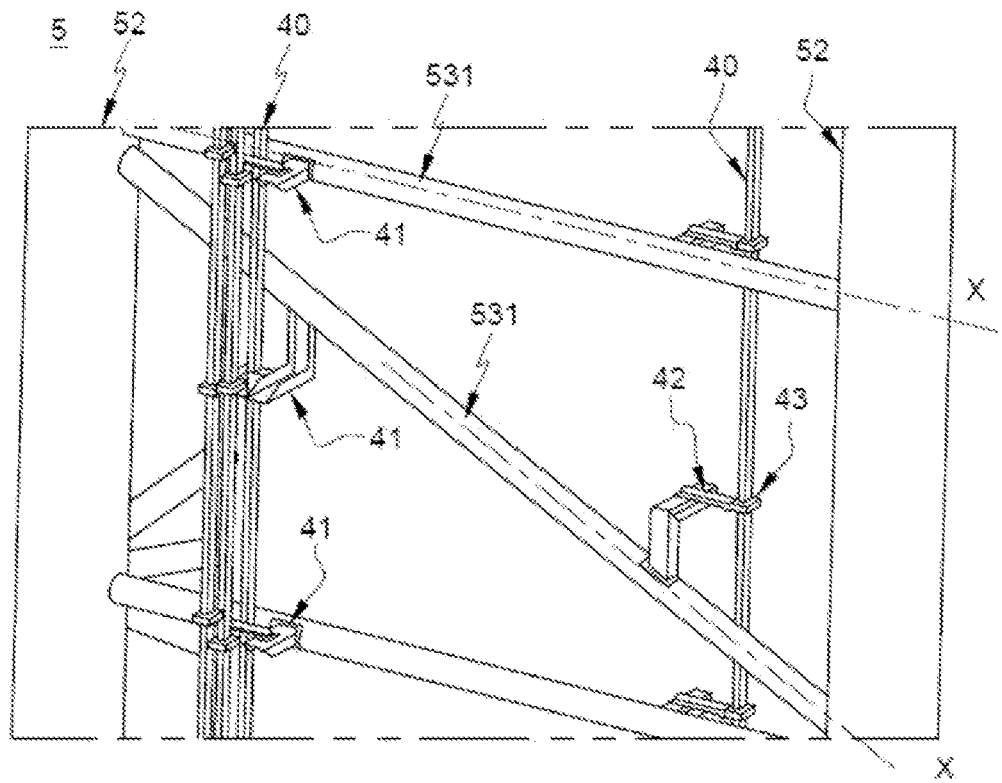
FIG. 1 represents a portion of a loading and/or offloading tower of the prior art.

FIG. 1 represents a portion of a loading and/or offloading tower of the prior art, and has been described previously.

Figure 2:
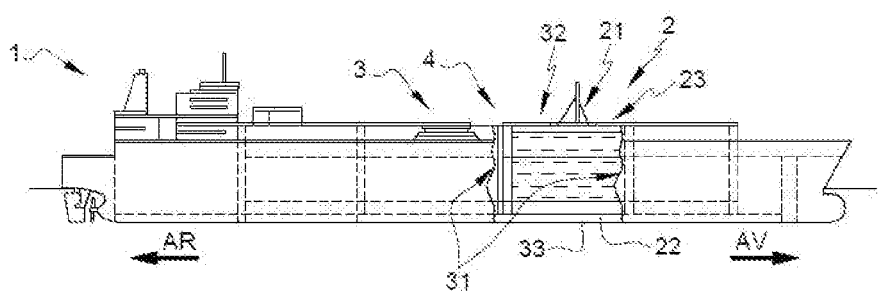
FIG. 2 is a schematic view of a ship comprising a liquefied gas storage tank incorporating a loading and/or offloading assembly according to the invention.

FIG. 2 is a schematic view of a ship comprising a liquefied gas storage tank incorporating a loading and/or offloading assembly according to the invention.

The ship 1 comprises at least one tank 2 intended for the storage of gas in the liquid state, particularly liquefied natural gas (abbreviated to LNG) or liquefied petroleum gas (LPG) or any other liquefied gas, such as ammonia. Preferably, the gas transported is liquid at a cryogenic temperature.

The ship 1 comprises a bearing structure 3 intended to receive the walls of the tank 2. The bearing structure 3 is notably formed by the double-hull of the ship 1. The bearing structure 3 has a generally polyhedral form. The bearing structure 3 comprises front and rear transverse walls 31, called cofferdam walls of the ship, extending transversely to the longitudinal direction of the ship 1. The bearing structure 3 also comprises a top wall 32 and a bottom wall 33 extending in the longitudinal direction of the ship and linking the front and rear transverse walls 31.

Thus, the top 32, bottom 33 and lateral 31 walls form bearing walls of the bearing structure. These bearing walls have a surface delimiting an internal space in which the tank 2 is housed. The tank 2 comprises a plurality of tank walls, each tank wall is anchored onto a respective bearing wall of the bearing structure 3.

Preferably (but in a way that is not limiting on the invention), the tank 2 is a membrane tank having a multi-layer structure. The tank comprises, in a thickness-wise direction from the outside to the inside of the tank, a secondary thermally insulating barrier, a secondary sealed membrane resting on the secondary thermally insulating barrier, a primary thermally insulating barrier resting on the secondary sealed membrane and a primary sealed membrane resting on the primary thermally insulating barrier and intended to be in contact with the liquefied gas contained in the tank 2. Thus, in order to maintain the gas in the liquid state, the tank is sealed and thermally insulated.

The tank 2 is equipped with a loading and/or offloading assembly 4 according to the invention which, depending on the desired mode of use, makes it possible to extract liquefied gas out of the tank, but also to supply the tank with liquefied gas.

The loading and/or offloading assembly 4 comprises at least one loading and/or offloading tower 5, an offloading device 6 and a cover 7 intended to close a storage volume of the tank 2. Hereinafter in the description, the loading and/or offloading tower will, in the interests of simplicity, be simply called the tower.

More particularly, the tank 2 comprises an aperture 21, formed in the top wall 23 of the tank, intended notably to allow the passage of the tower 5 into the enclosure of the tank 2, for example when it is being installed. The aperture 21 is configured to cooperate with the cover 7 of the loading and/or offloading assembly 4 which, when the tower 5 is installed in the tank, extends parallel to the top wall 23 of the tank 2 and blocks the aperture 21 to make the tank sealed and thermally insulated.

The cover 7 consists of a flat plate secured to the top wall 23 of the tank by welding and/or by means of fixing members, such as a screw/nut system. The cover 7 is composed of a set of metal parts which give it a mechanical strength and can also include a thermal insulation. The cover 7 is configured to hold the tower 5 suspended in the tank.

Figure 3:
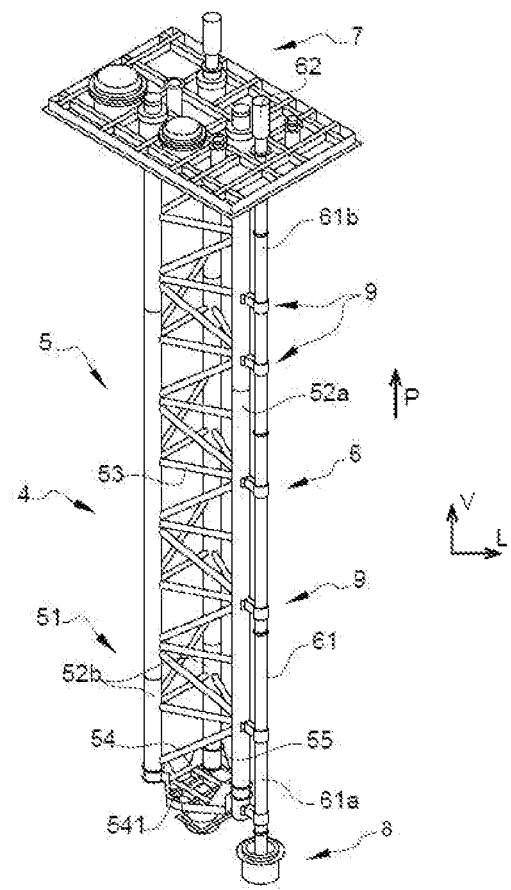
FIG. 3 is a perspective schematic view of a loading and/or offloading assembly.

FIG. 3 is a perspective schematic view of a loading and/or offloading assembly.

As can be seen in FIG. 3, the cover 7 is at least partly passed through by the tower 5 and by the offloading device 6.

The tower 5 comprises a structure 51 which extends along a main direction of elongation P in the vertical direction V, comprising, in this example and in a nonlimiting manner, three masts 52. More specifically, the structure 51 of the tower 5 also comprises a lattice structure 53 intended to link the different masts 52 of the tower 5 to one another in order to make the latter rigid. The lattice structure 53 is composed of a plurality of intersecting cylindrical beams extending between at least two masts 52 of the tower, over all or part of its height. These beams are also called crossmembers or struts.

In the example illustrated in FIG. 3, and preferably, each of the three masts 52 passes through the cover 7 of the tank. A front mast 52a and two rear masts 52b, are then defined, defined by the direction of advance AV of the ship, visible in FIG. 2, in normal navigation conditions, the front mast 52a being the foremost mast of the structure 51 in the tank 2.

Thus, the tower 5 comprises a plurality of masts 52 extending from the cover 7 to the bottom wall 22 of the tank 2, in line with the aperture 21.

Each mast 52 of the tower 5 consists of a hollow rod, of circular section and being able, for example, to be made of stainless steel. A mast 52 is composed of a plurality of cylindrical segments welded to one another. A first end of the mast extends to around the top wall 23 of the tank, a second end of the mast, opposite the first end, extends to around the bottom wall 22 of the tank. Thus, the masts 52 each define a duct which can, for example, contain at least one pump element.

The masts 52 of the tower 5 are, around their respective second ends, held secure by means of a base reinforcement 54 which passes at least partly through the bottom wall 22 of the tank 2. More specifically, the base reinforcement 54 can comprise at least one platform 541 secured to each of the masts 52 of the structure 51 of the tower 5 and a foot which extends from the platform 541 and is secured to the bottom wall 33 of the bearing structure 3 by passing through the bottom wall 22 of the tank 2.

In the example illustrated in FIG. 3, one of the rear masts 52b of the tower is equipped with an offloading pump 55 housed at least partly in the hollow rod of the mast 52b. The other rear mast 52b and the front mast 52a are structural masts supporting the tower and the offloading device 6.

These structural masts can also serve to support a liquefied gas loading duct, not represented, the function of which is to allow the tank to be filled with liquefied gas, but also a supply pump intended to supply liquefied gas to an engine, not represented, of the ship.

As can be seen in FIG. 3, the offloading device 6, distinct from the offloading pump 55 housed in one of the rear masts 52b of the tower 5, comprises an offloading duct 61, a suction element (not visible) disposed at a first end 61a of the offloading duct 61, and a drive assembly 62 disposed at a second end 61b of the offloading duct 61. The cover 7 is disposed between the suction element and the drive assembly 62. More specifically, the suction element is disposed in the storage volume of the tank 2 whereas the drive assembly 62 is disposed outside of the storage volume of the tank 2 and is preferably borne by the outer face of the cover 7. At least one driveshaft (not represented) links the suction element to the drive assembly 62. More particularly, the driveshaft extends in an internal volume of the offloading duct 61 and allows the suction element to be actuated under the effect of the drive element 62 in order to allow the liquefied gas to be pumped and extracted from the tank.

As explained previously with reference to FIG. 1, a loading and/or offloading tower is generally equipped with measurement instruments intended to monitor the cargo of the liquefied gas present in the tank. The measurement instruments can be temperature sensors for monitoring the temperature of the liquefied gas. They can also be instruments for measuring the liquefied gas liquid level in the tank to determine the level of filling of the tank. These measurement instruments must be guided along the tower. They are disposed, with the associated wiring to allow them to be connected by wire, and/or an electrical power supply, in protection tubes 40. More specifically, in the case of a level measurement instrument of radar type, the protection tube 40 serves to guide the radar wave to the bottom of the tube. In the case of level measurement instruments of float type, small floats are installed with wiring in the protection tube 40. In the case of temperature measurement instruments, a sensor with its wiring is positioned in the protection tube. These tubes extend vertically along the tower and each have a plate 42 to allow a support device to be fixed.

Figure 4:
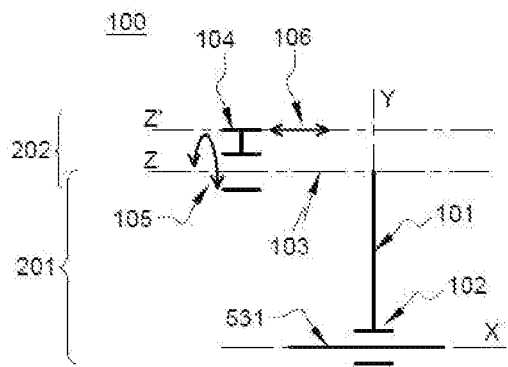
FIG. 4 is a kinematic representation of the support device according to the invention.

FIG. 4 is a kinematic representation of the support device 100 according to the invention. As a reminder, an instrument is understood to be an assembly composed of a protection tube 40 (containing the measurement instrument or instruments) and its plate 42. The support device 100 is intended to support/guide at least one instrument 40 on the loading and/or offloading tower 5 of a tank of a ship intended to contain a liquefied gas. As mentioned previously, the vertical masts 52 of the tower 5 are linked to one another, pairwise, by struts 531, and each strut 531 extends locally on an axis called strut axis X. In other words, each strut has an associated strut axis X. According to the invention, the support device 100 comprises a distal portion 101 extending on a first axis Y, substantially at right angles to the strut axis X. The distal portion 101 is terminated by a first surface 102 capable of forming a first surface contact with a strut 531 extending on its strut axis X substantially at right angles to the first axis Y. Also, the first surface 102 has, in a configuration of installation (that is to say when it is being positioned on the tower, before the support device is fixed to the tower), a degree of freedom in rotation about said strut axis X which is associated with it. This degree of freedom in rotation makes it possible to orient the support device with respect to the instrument and around the strut 531 on which it bears.

The support device 100 comprises a proximal portion 103 extending on a second axis Z substantially at right angles to the first axis Y. The proximal portion 103 is securely linked to the distal portion 101.

The support device 100 comprises a fixing surface 104 having, in the configuration of installation, a degree of freedom in rotation 105 about the second axis Z and a degree of freedom in translation 106 on a third axis Z' parallel to the second axis Z, the fixing surface 104 being intended to be immobilized by fixing to the instrument (and more specifically to the plate 42) in a final configuration.

In its final configuration, the support device is in surface contact with a strut portion according to the first surface contact and in surface contact with the instrument (that is to say with the plate 42) by the fixing surface 104. The support device is thus configured to exert a force against said strut portion on the axis Y at right angles to the strut axis X and a force against the plate 42 on an axis at right angles to the axis Z.

Advantageously, the two contact surfaces 102, 104 are at a distance from one another in a projection in a plane containing the surface 104. In other words, the support device can be seen as a brace between the strut 531 and the plate 42.

By virtue of these features, the support device of the invention is suitable for supporting/guiding an instrument regardless of its position along the tower 5. The combination of the degrees of freedom of the support device allows it to be positioned against a strut portion and allows the fixing surface to be positioned on the one hand about the axis X and on the other hand about the axis Z and along the axis Z to ensure the bearing against the plate of the instrument. The degree of freedom in rotation of the first surface and the two degrees of freedom (rotation and translation) of the fixing surface allow an adaptive placement of the support device for any angle and any symmetry that might exist between the struts and the instruments. The result thereof is that a single support device according to the invention can be used to support the instruments all along the tower 5 despite the different distances/orientations of the bearing points between the plates and the struts.

In an embodiment of the invention, the degree of freedom of the fixing surface in rotation 105 about the second axis Z and the degree of freedom of the fixing surface in translation 106 on the third axis Z' can be dependent on one another, for example through the intermediary of a helical link of the fixing surface 104 on the proximal portion 103. This configuration with combined movement is advantageous for a screw pitch that is small enough to allow a fine adjustment of the positioning of the fixing surface 104 along the axis Z in the desired orientation about this same axis Z.

In another embodiment of the invention, and preferentially, the degree of freedom of the fixing surface in rotation 105 about the second axis Z and the degree of freedom of the fixing surface in translation 106 on the third axis Z' are independent of one another. This configuration makes it possible to orient the fixing surface 104 about the axis Z and to position it along the axis Z' precisely as desired to ensure that contact is made with the plate 42.

Figure 5:
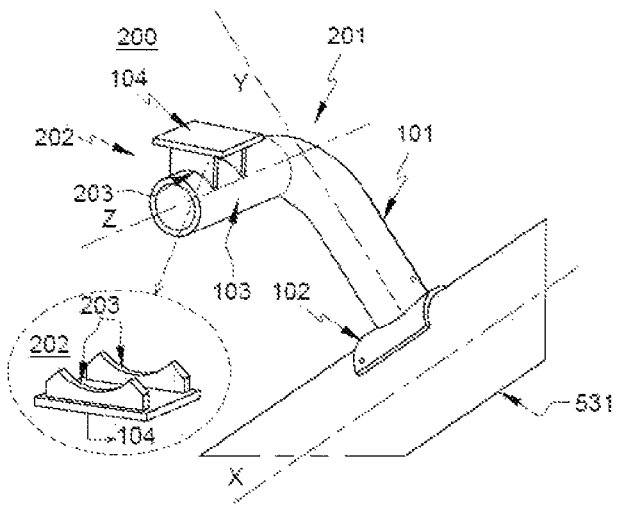
FIG. 5 represents an embodiment of the support device of the invention.

FIG. 5 represents an embodiment of the support device 200 of the invention. In this embodiment, the support device 200 comprises a bent piece 201 comprising the distal portion 101 and the proximal portion 103. Also, the support device 200 comprises a platform 202 comprising the fixing surface 104 and a positioning surface 203 having a form complementing the proximal portion 103 and intended to cooperate (that is to say come into contact) with the proximal portion 103.

In this embodiment, the proximal portion has a circular section defined by an outer radius, and the form complementing the positioning surface is a circular arc with a radius substantially equal to the outer radius.

Bottom left in the figure, the platform 202 is represented alone for better visibility of the positioning surface 203. The fixing surface 104 corresponds to a face of the platform 202 and the positioning surface 203 is situated opposite this face. In this example, the positioning surface is composed of two curved surfaces spaced apart from one another for better stability of the platform 202 around the proximal portion 103. However, the invention applies similarly to a positioning surface 203 with a single curved surface. In all cases, the radius of curvature of the curved surface or surfaces corresponds to the outer radius of the circular section of the proximal portion as explained previously.

Figure 6:
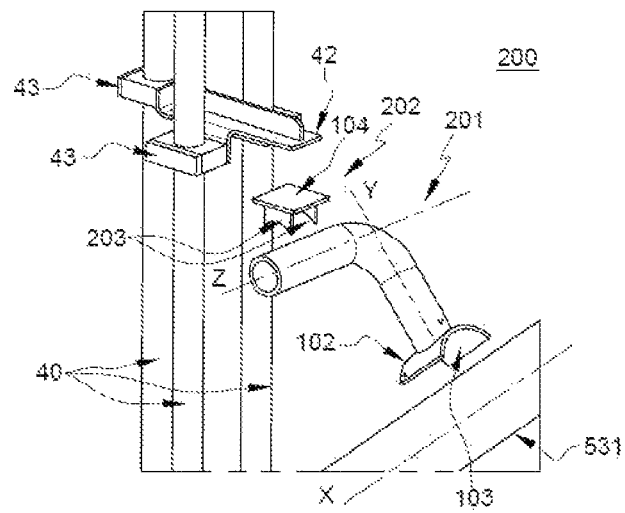
FIG. 6 represents the support device of FIG. 5 in its configuration of installation.

FIG. 6 represents the support device of FIG. 5 in its configuration of installation. The bent piece 201 is put in place by the abutting of the first surface 102 against the strut 531 and rotation of the bent piece about the axis X so as to position the proximal portion 103 above (or below) the plate 42 in a vertical direction. Then, the platform 202 is positioned on the proximal portion of the bent piece 201. More specifically, the positioning surface 203 comes into abutment against the proximal portion and the platform 202 and made to rotate about the axis Z and/or translated on the axis Z' parallel to the axis Z, in such a way that the fixing surface 104 is parallel to the plate 42 and facing the plate 42. The holding piece 43 can then be slid along the tube 40 for the plate 42 to come into abutment against the surface 104.

Figure 7:
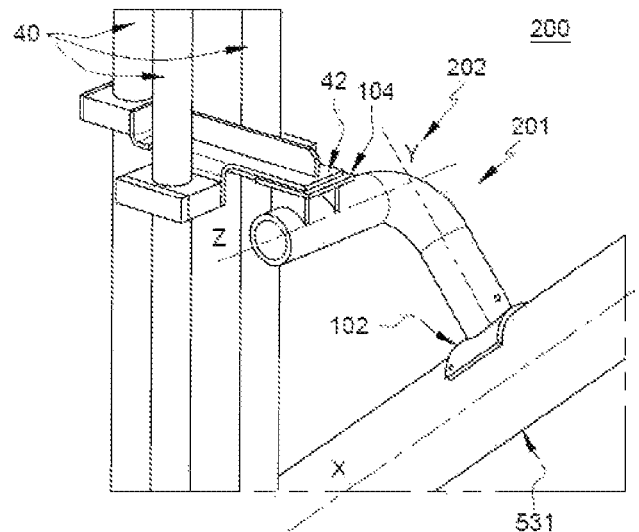
FIG. 7 represents the support device of FIG. 5 in its final configuration.

FIG. 7 represents the support device of FIG. 5 in its final configuration. The first surface 102 is then fixed (by rivet or screw/nut system or by welding) to the strut, the platform 202 is then fixed to the proximal portion 103, for example by welding, and the fixing surface 104 can be fixed to the plate 42, for example by welding.

In the embodiment presented in FIG. 7, the bent piece can be composed of a plurality of segments welded to one another, for example two cylindrical segments for the distal and proximal portions and one segment of rounded form to link the distal and proximal portions to one another.

Figure 8:
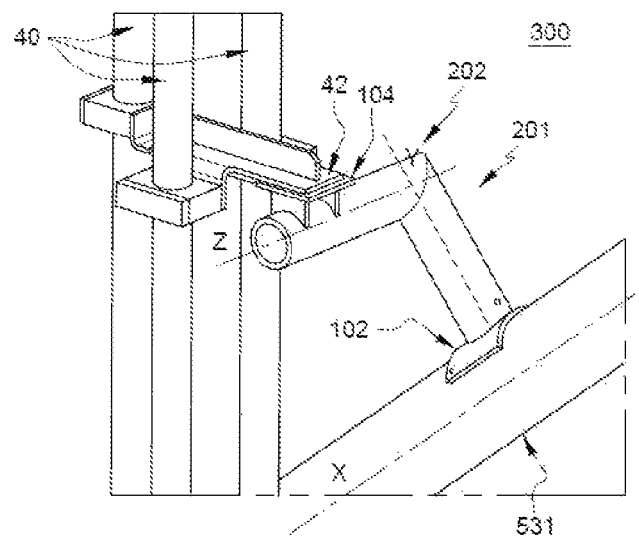
FIG. 8 represents another embodiment of the support device of the invention in its final configuration.

FIG. 8 represents another embodiment of the support device 300 of the invention in its final configuration. This embodiment is identical to the embodiment presented in FIG. 7 except that the bent piece is composed of a cylindrical segment for the distal portion and a cylindrical segment for the proximal portion, the two cylindrical segments being directly fixed to one another, for example by welding, by virtue of their bevelled end.

Figure 9:
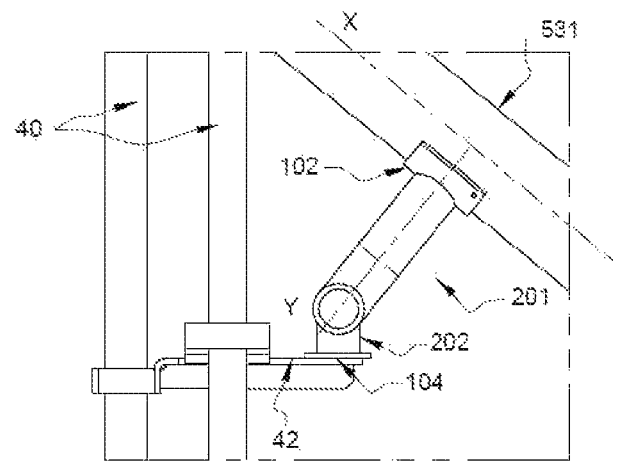
FIG. 9 represents the embodiment of the support device of the invention similar to the embodiment presented in FIG. 7 in a different orientation with respect to the tower.

FIG. 9 represents the embodiment of the support device of the invention similar to the embodiment presented in FIG. 7 in a different orientation with respect to the tower. It can thus be seen that, regardless of the orientation of the support device according to the invention, the combination on the one hand of the degree of freedom in rotation of the distal portion 101 about the strut axis 531, and the degrees of freedom of the fixing surface 104 in rotation about the axis Z and in translation along the axis Z' on the other hand, addresses the issue of plurality of configurations between struts 531 and plates 42 and makes it possible to provide the instrument support.

Advantageously, the distal and proximal portions are at least partially hollow, for material cost and embedded weight reasons. Nevertheless, it is also possible to envisage distal and/or proximal portions that are at least partially solid.

Advantageously, the support device according to the invention is made of a metallic material, preferably of stainless steel. This feature offers a good resistance to the thermomechanical strains to which the support device is subjected in the tank loaded with liquefied gas.

Figure 10:
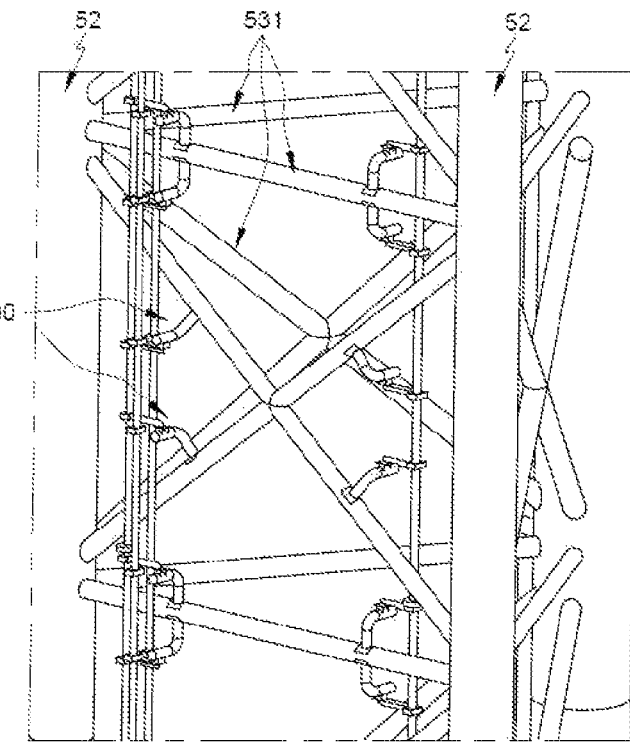
FIG. 10 represents a portion of a loading and/or offloading tower according to the invention.

The invention also relates to a loading and/or offloading assembly for a tank 2 of a ship 1 intended to contain a liquefied gas comprising a loading and/or offloading tower 5 comprising a plurality of vertical masts 52 intended to extend in the tank 2 and linked to one another, pairwise, by struts 531, each strut 531 extending on an axis called strut axis X, at least one instrument and at least one support device as previously described supporting the at least one instrument on the loading and/or offloading tower 5. FIG. 10 represents a portion of a loading and/or offloading tower illustrating such an assembly according to the invention.

The invention relates also to a tank 2 of a ship 1 intended to contain a liquefied gas comprising such a loading and/or offloading assembly, and to a ship 1 comprising a double-hull and said tank disposed in the double-hull.

Figure 11:
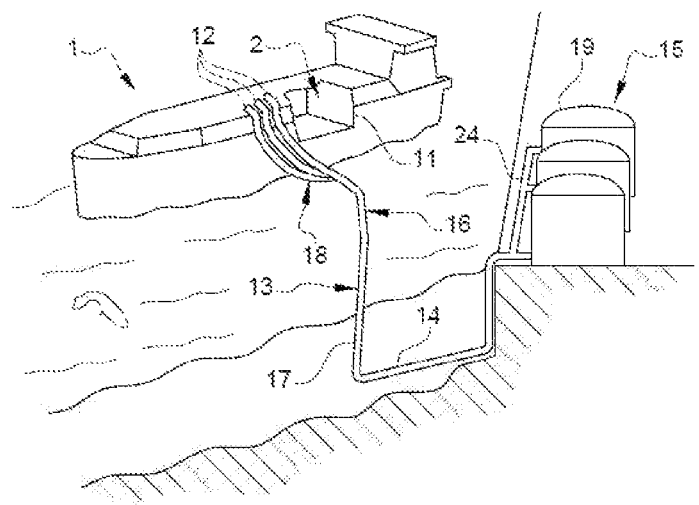
FIG. 11 is a cutaway schematic representation of a ship comprising a liquefied natural gas storage tank and a terminal for loading/offloading this tank.

FIG. 11 is a cutaway schematic representation of a ship 1 comprising a liquefied natural gas storage tank 2 and a terminal for loading/offloading this tank. The cutaway view of the ship 1 shows a sealed and insulated tank 2 of generally prismatic form mounted in the double-hull 11 of the ship.

As is known per se, loading/offloading pipelines 12 disposed on the top deck of the ship can be coupled, by means of appropriate connectors, to a maritime or port terminal to transfer a cargo of LNG from or to the tank 2.

FIG. 11 also represents an example of a maritime terminal comprising a loading and offloading station 13, a submarine duct 14 and an onshore installation 15. The loading and offloading station 13 is a fixed offshore installation comprising a movable arm 16 and a riser 17 which supports the movable arm 16. The movable arm 16 bears a bundle of insulated flexible pipes 18 that can be connected to the loading/offloading pipelines 12. The orientable movable arm 16 adapts to all methane tanker templates. A link duct that is not represented extends inside the riser 17. The loading and offloading station 13 allows the ship 1 to be loaded and offloaded from or to the onshore installation 15. The latter comprises liquefied gas storage tanks 19 and link ducts 24 linked by the submarine duct 14 to the loading or offloading station 13. The submarine duct 14 allows the liquefied gas to be transferred between the loading or offloading station 13 and the onshore installation 15 over a great distance, for example 5 km, which makes it possible to keep the ship 1 at a great distance from the coast during the loading and offloading operations.

To generate the pressure necessary for the transfer of the liquefied gas, pumps are implemented which are embedded in the ship 2 and/or with which the onshore installation 15 is equipped and/or with which the loading and offloading station 13 is equipped.

The invention relates also to a computer program comprising computer-executable instructions which, when they are executed by a processor, cause the processor to control an additive manufacturing device to manufacture the support device according to the invention.

The invention relates finally to a method for manufacturing such a support device by additive manufacturing, the method comprising:
  obtaining an electronic file representing a geometry of the support device according to the invention; and
  controlling an additive manufacturing device to manufacture, in one or more additive manufacturing steps, the support device according to the geometry specified in the electronic file.

It should be noted that the support device according to the invention can also be manufactured by other manufacturing methods, for example by welding distal and proximal portions or bending of the bent piece from a cylindrical tube, and machining (for example by milling) the platform.

Although the invention has been described in relation to several particular embodiments, it is clearly obvious that it is in no way limited thereto and that it encompasses all the technical equivalents of the means described and the combinations thereof provided the latter fall within the framework of the invention, as defined by the claims.

The use of the verb "comprise" or "include" and the conjugated forms thereof does not preclude the presence of elements or steps other than those stated in a claim.

In the claims, any reference symbol between parentheses should not be interpreted as a limitation of the claim.

It will be more generally apparent to the person skilled in the art that various modifications can be made to the embodiments described above, in light of the teaching which has just been disclosed to him or her. In the following claims, the terms used should not be interpreted as limiting the claims to the embodiments explained in the present description, but should be interpreted to include therein all the equivalents that the claims aim to cover by virtue of their formulation and the provision of which is within the scope of the person skilled in the art based on his or her general knowledge.

The invention claimed is:

1. A loading and/or offloading assembly for a tank of a ship configured to contain a liquefied gas comprising a loading and/or offloading tower comprising a plurality of vertical masts configured to extend in the tank and linked to one another, pairwise, by struts, each strut extending on an axis called strut axis, at least one instrument and at least one support device of the at least one instrument, the loading and/or offloading assembly being characterized in that the support device comprises:
  a distal portion extending on a first axis, the distal portion being terminated by a first surface forming a first surface contact with a strut extending on its strut axis substantially at right angles to the first axis, the first surface having, in a configuration of installation, a degree of freedom in rotation about said strut axis;
  a proximal portion extending on a second axis substantially at right angles to the first axis, linked to the distal portion;
  a fixing surface having, in the configuration of installation, a degree of freedom in rotation about the second axis and a degree of freedom in translation on a third axis parallel to the second axis, the fixing surface being immobilized by fixing to the instrument in a final configuration; and
  a platform comprising the fixing surface and a positioning surface configured to couple the proximal portion to the fixing surface, wherein the positioning surface has a shape that is complimentary to a shape of the proximal portion to allow for the degree of freedom in rotation about the second axis and the degree of freedom in translation on a third axis parallel to the second axis.

2. The loading and/or offloading assembly according to claim 1, wherein the degree of freedom of the fixing surface in rotation about the second axis and the degree of freedom of the fixing surface in translation on the third axis are independent of one another.

3. The loading and/or offloading assembly according to claim 1, wherein the support device comprises:
   a bent piece comprising the distal portion and the proximal portion.

4. The loading and/or offloading assembly according to claim 3, wherein the proximal part has a circular section defined by an outer radius, and the complementary form of the positioning surface is a circular arc of a radius substantially equal to the outer radius.

5. The loading and/or offloading assembly according to claim 1, wherein the distal and proximal portions are at least partially hollow.

6. The loading and/or offloading assembly according to claim 1, made of a metallic material, preferentially of stainless steel.

7. A tank of a ship configured to contain a liquefied gas comprising a loading and/or offloading assembly according to claim 1.

8. A ship comprising a double-hull and a tank according to claim 7 disposed in the double-hull.

9. A method for loading or offloading a ship according to claim 8, wherein a fluid is conveyed through insulated pipelines from or to a floating or onshore storage installation to or from the tank of the ship.

10. A transfer system for a fluid, the system comprising a ship according to claim 8, insulated pipelines arranged so as to link the tank installed in the double-hull of the ship to a floating or onshore storage installation and a pump for driving a fluid through the insulated pipelines from or to the floating or onshore storage installation to or from the tank of the ship.

11. The loading and/or offloading assembly according to claim 1, wherein the fixing surface is a separably couplable component to the proximal portion.

12. The loading and/or offloading assembly according to claim 1, wherein the first surface and the fixing surface are separated in the direction of the first axis by a distance that corresponds to an approximate length of the distal portion.

\* \* \* \* \*